United States Patent [19]
Guiffant et al.

[11] Patent Number: 6,053,723
[45] Date of Patent: Apr. 25, 2000

[54] DEVICE FOR MOULDING CONTAINERS FROM A THERMOPLASTIC MATERIAL, AND CONTAINER PRODUCTION PLANT USING SAME

[75] Inventors: Alain Guiffant, Le Havre; Jean-François Grouas, Epouville, both of France

[73] Assignee: Sidel, Octeville-sur-Mer, France

[21] Appl. No.: 09/011,185

[22] PCT Filed: Jul. 31, 1996

[86] PCT No.: PCT/FR96/01207

§ 371 Date: May 13, 1998

§ 102(e) Date: May 13, 1998

[87] PCT Pub. No.: WO97/05999

PCT Pub. Date: Feb. 20, 1997

[30] Foreign Application Priority Data

Aug. 3, 1995 [FR] France ................................. 95 09468

[51] Int. Cl.⁷ ............................ B29C 31/08; B29C 49/56
[52] U.S. Cl. .................. 425/534; 425/451.4; 425/451.5; 425/541
[58] Field of Search .............. 425/451.4, 451.5, 425/541, 534

[56] References Cited

U.S. PATENT DOCUMENTS

| | | | |
|---|---|---|---|
| 3,685,943 | 8/1972 | Fischer | 425/541 |
| 3,854,857 | 12/1974 | Fischer et al. | 425/541 |
| 4,141,680 | 2/1979 | Kauffman et al. | 425/534 |
| 4,355,968 | 10/1982 | Lagoutte et al. | 425/526 |
| 4,484,884 | 11/1984 | Wiatt et al. | 425/534 |
| 4,611,981 | 9/1986 | English | 425/541 |
| 5,225,216 | 7/1993 | Barracchini et al. | 425/451.5 |
| 5,346,386 | 9/1994 | Albrecht et al. | 425/541 |

FOREIGN PATENT DOCUMENTS

| | | |
|---|---|---|
| 305 705 | 3/1989 | European Pat. Off. . |
| 371 175 | 6/1990 | European Pat. Off. . |
| 456 866 | 11/1991 | European Pat. Off. . |
| 534838 | 3/1993 | European Pat. Off. ............ 425/451.4 |
| 2646802 | 11/1990 | France ................................. 425/541 |
| 2 653 058 | 4/1991 | France . |

*Primary Examiner*—Robert Davis
*Attorney, Agent, or Firm*—Sughrue, Mion, Zinn, Macpeak & Seas, PLLC

[57] ABSTRACT

A device for blow molding or stretch-blow molding containers from thermoplastic preforms. The device comprises a book mold (2) and actuating means (5) for opening and closing the two pivotable mold halves (3), including a movable arm (7) freely rotatable about an axis (8) and secured to the two mold halves (3), and drive means synchronized with the feed rate of the preforms into the mold and designed to actuate guide means having a cam (13) and a cam follower (12) for moving the arm (7) to control the opening and closing of the mold (2).

13 Claims, 2 Drawing Sheets

DEVICE FOR MOULDING CONTAINERS FROM A THERMOPLASTIC MATERIAL, AND CONTAINER PRODUCTION PLANT USING SAME

BACKGROUND OF THE INVENTION

The present invention relates to improvements made to devices for blow molding or stretch-blow molding containers, especially bottles, from thermoplastic preforms. The device includes a bill-fold type mold having two half-shells joined to each other by a mutual pivoting pin, coinciding with respective edges of the two half-shells, and actuation means associated with the two half-shells in order to pivot the latter with respect to each other in the mold-closing direction or in the mold-opening direction, as well as to container manufacturing plants which make use of such a molding device.

Document FR-A-2,646,802 shows, in its FIG. 4, one arrangement of a bill-fold mold as mentioned above, in which the mold is closed and opened by a reciprocating rotational motion of a driving arm. The said reciprocating rotational motion is described and shown as being conferred by a driveshaft perpendicular to said arm to which it is fastened by fitting onto a square, but no information is provided with regard to the manner in which the driveshaft itself is set into motion.

The object of the present invention is essentially to provide a simple technical solution which can be used to set a mold in motion, such as the one in FIG. 4 of the aforementioned document, and also to provide, because of the simplicity of said means, a complete manufacturing plant constructed around such a single-mold molding device, the half-shells of which can pivot about a fixed pin, which has a simple and reliable design and is capable of maintaining synchronous operation of all its component parts.

Such a single-mold device and fixed pivoting pin are already known from document EP 0,456,866. However, this document does not tackle the problem of synchronizing the opening and closing of the mold with the operation of the other elements of the machine.

SUMMARY OF THE INVENTION

For these purposes, according to a first of its aspects, the invention provides a molding device as mentioned in the preamble, having a single mold and a fixed pivoting pin, which, being arranged in accordance with the invention, is essentially characterized in that the actuation means comprise a movable arm mounted so as to rotate freely about a support pin and fastened to said two half-shells, this arm furthermore supporting a cam follower, or a guide cam capable of engaging with a rotating guide cam, or alternatively a cam follower driven over a circular path, said cam being profiled in such a manner as to cause the arm to move so as to open and close the mold, and drive means for driving the rotating cam, or alternatively the cam follower, said drive means being synchronized with the feeding of the mold with preforms.

Preferably, the pin for supporting the arm is located in a region of the arm lying between its two ends; a first end of the arm is fastened to the two half-shells and a second end of the arm supports the cam follower, or alternatively the cam; in a manner known per se, the actuation means may furthermore comprise two swing links which are articulated, so as to rotate freely by one of their ends, to the abovementioned first end of the arm and are articulated, so as to rotate freely by their other end, respectively to the two half-shells on each side of the mutual pivoting pin of the latter.

In a preferred embodiment, the cam follower is borne by the arm and the rotating cam is provided in or supported by a rotating plate.

In order to construct a device which has both a reliable operation and a simple structure, provision is preferably made for the cam to be configured in order to engage with the cam follower at least from the start of mold opening until at least the end of mold closing, and auxiliary locking means, which are independent of the aforementioned actuation means, are provided in order to keep the mold locked during molding from the end of mold closing until the start of mold opening; advantageously, then, the cam extends along an open section and no longer engages with the cam follower between at least the end of mold locking and at least the start of mold unlocking.

In a particularly preferred arrangement, with which a rotating-clamp mechanism for feeding the hot preforms is associated, the rotating clamp is coaxial with the rotating cam, or alternatively with the rotating roller, and fastened to the rotating cam, or alternatively to the rotating roller, whereby the operation of feeding the hot preforms into the mold (mold feeding) and the molding operation are perfectly synchronized, and this synchronization is obtained without involving the use of complex external means, by forming a structure which is remarkable because of its simplicity and its small volume.

According to a second aspect of the invention, a plant is proposed for manufacturing containers, especially thermoplastic bottles, by blow molding or stretch-blow molding hot preforms, which includes means for feeding preforms presented side by side one after the other in a vertical position, a wheel for loading and for stepping by a predetermined spacing the preforms delivered by the feed means, an endless chain of preform-transfer means which is driven by a drive wheel and designed to grip the preforms one by one on the loading wheel and to make them pass through a heating oven at a predetermined temperature in the neck-down position, a rotating insertion clamp capable of gripping the preforms one by one on the transfer chain and feeding them into the molding device, a single-mold molding device of the type described above, and a rotating extraction clamp capable of gripping the molded containers in the molding device and of taking them away to removal means, which plant, being designed in accordance with the invention, is essentially characterized in that it furthermore comprises a single rotating drive member, and rotating endless link driving means suitable for driving, without any possibility of slippage, the above-mentioned elements of the plant by means of the single motor.

Preferably, the rotating insertion clamp is coaxial with the rotation pin of the rotating cam and rotationally integral with the latter; in this case, it is advantageous for on the one hand the rotating cam and the insertion clamp, on the other hand the extraction clamp and finally on the other hand the wheel for driving the transfer chain to be driven by respective belts and, in order to simplify the arrangement of the plant as much as possible, it may be desirable to provide for the loading wheel to be driven by the transfer chain.

By virtue of all the envisaged arrangements within the scope of the invention, it is possible to produce a single-mold container manufacturing plant in which a single drive member is used for positive driving of all the moving component parts, these then being driven synchronously without any slippage: thus, a mechanically simple and functionally reliable plant is formed.

BRIEF DESCRIPTION OF THE DRAWINGS

The invention will be more clearly understood on reading the detailed description which follows of a preferred embodiment given solely by way of purely illustrative example. In this description, reference will be made to the appended drawings in which.

DETAILED DESCRIPTION OF THE PREFERRED EMBODIMENT

Figure 1:
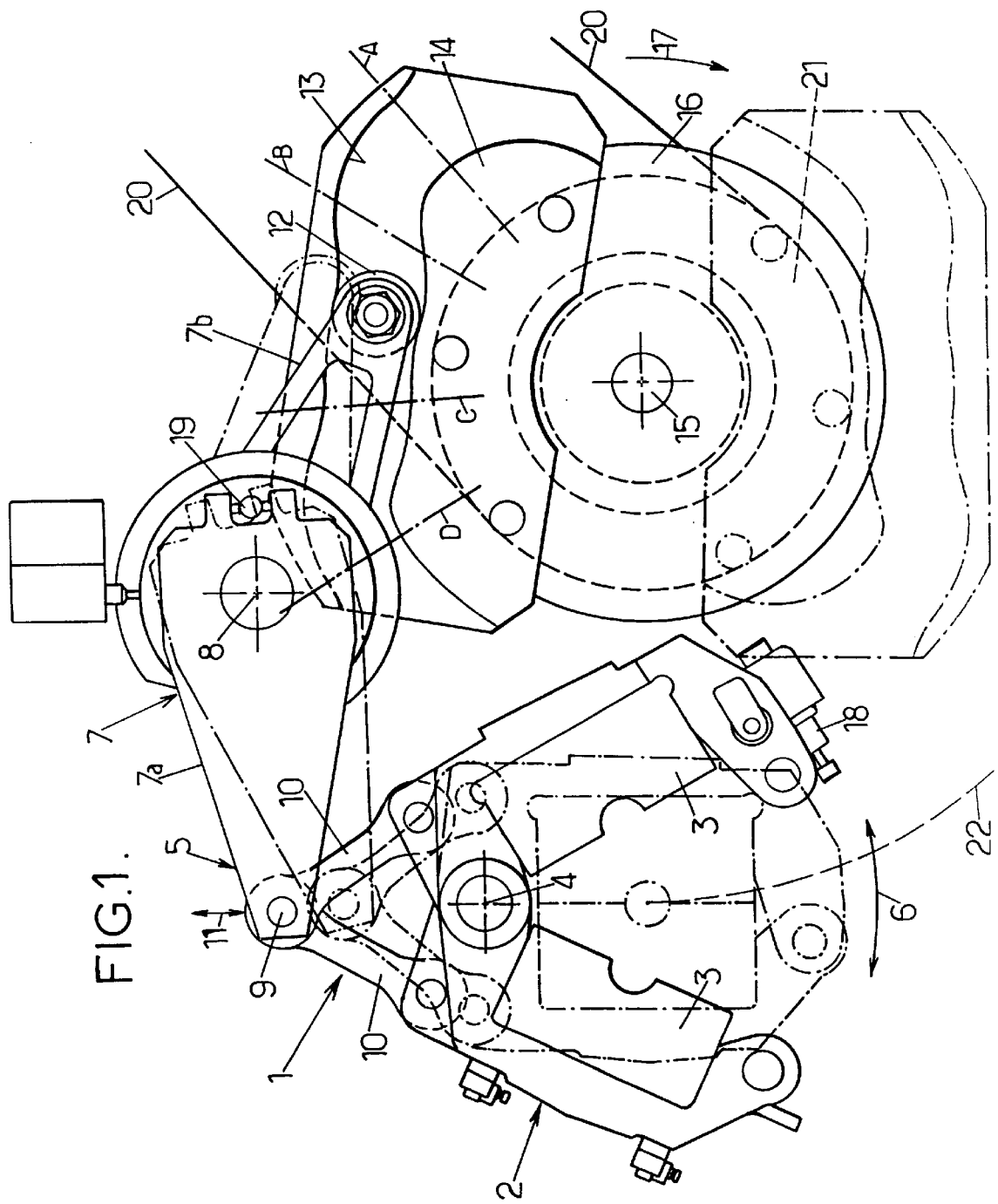
FIG. 1 is a diagrammatic view, from above, of a molding device designed in accordance with the invention.

Referring first of all to FIG. 1, the numerical reference 1 denotes in its entirety a device for blow molding or stretch-blow molding containers, especially bottles, from hot preforms made of a thermoplastic such as, for example, polyethylene terephthalate PET, polyethylene naphthalate PEN or another thermoplastic. The device 1 includes a single bill-fold type mold 2 having two half-shells 3 joined to each other by a fixed mutual pivoting pin 4 coinciding with respective edges of the two half-shells 3.

Actuation means 5 are associated with the two half-shells 3 in order to make them pivot with respect to each other in the mold-closing direction or in the mold-opening direction (arrow 6). Said actuation means 5 comprise an arm 7 mounted so as to rotate freely about a pin 8 parallel to the aforesaid pin 4, the pin 8 being preferably arranged between the free ends of the arm 7. At one of its ends, the arm 7 is connected, so as to be freely hinged by a common pin 9 at the respective ends of the two articulated swing links 10, via their opposite ends to the half-shells 3 at points on the latter which are symmetrically at a certain distance from the pin 4. Any pivoting of the arm 7 about the pin 8 in one direction or the other results in a reciprocating motion of the pin 9 (arrow 11), moving it closer to or further away from the pin 4, and therefore respectively in closing or opening the mold.

At its other end, the arm 7 bears an idle roller or cam follower 12 capable of engaging with a cam 13 profiled in the form of a channel hollowed out in a piece 14 set in a rotational motion about a pin 15: for this purpose, the piece 14 may be supported by a plate 16 which rotates about the pin 15. Of course, a reverse arrangement, with the cam follower supported by the rotating plate and the cam provided on the end of the arm 7, is also conceivable. The cam 13 in the form of a channel or groove has two approximately parallel side faces capable of guiding the cam follower 12 in radially opposed directions of movement.

The cam is profiled in order to determine four successive functional positional limits of the arm, namely, as shown in FIG. 1 (the arrow 17 indicating the direction of continuous rotation of the piece 14):

limit A: start of mold opening,
limit B: end of mold opening,
limit C: start of mold closing,
limit D: end of mold closing.

In other words, while the roller 12 is in contact with the cam 13, between the limits B and C, the mold is open and a completed container may be extracted and then a hot preform may be inserted into the mold.

Likewise, while the roller is disengaged from the cam 13, between the limits D and A, the mold is closed and the blow molding or stretch-blow molding operation may be carried out.

The mold is kept locked in the closed position by specific locking means 18 and the roller 12/cam 13 assembly does not have to keep the mold in the closed position: under these conditions, the cam 13 does not have to extend between the limits D and A: as shown in FIG. 1, the cam 13 extends only over a curvilinear length between the limits A and D. In other words, when the mold is closed, the cam 13 does not engage with the roller 12 and the roller 12 is "up in the air" (represented by the dot-dash line in FIG. 1). Thus, the length of the cam 13 is optimized by being reduced to a minimum: this reduces the wear on the roller and facilitates maintenance, by making it possible to force the movements of the mold when the machine is stopped and the roller is away from the cam.

In the embodiment shown in FIG. 1, the arm 7 does not consist of a single piece but consists of two half-arms, respectively 7a and 7b which are rotationally mounted in a coaxial fashion on the pin 8 and extend on either side of the latter; the two half-arms 7a and 7b are rotationally integral with each other in a coaxial fashion on the pin 8 and extend on either side of the latter; the two half-arms 7a and 7b are rotationally integral with each other by a safety member 19, such as a torque limiter, which is capable of releasing the two half-arms from each other if the arm is subjected to a force greater than a predetermined threshold.

The plate 16 is rotationally driven by a motor (especially an electric motor), not shown, and by an endless link 20, such as a cogged belt, which engages without any slippage with a wheel or pulley 21 coaxial with the pin 15 and rotationally integral with the latter.

Also rotationally integral with the pin 15 is a gripping member of the rotating-clamp type (not shown) which is set into a complex rotational and radial displacement motion under the action of a cam (by way of example, document FR-A-2,479,077 describes one possible arrangement). This rotating clamp grips the hot preforms coming from the oven and feeds them into the open mold, the path followed by the preform being diagrammatically represented at 22 in a circular fashion in FIG. 1.

This arrangement ensures perfect synchronism between the motion of the rotating clamp and the molding operation, in other words between the mold opening and closing movements and the presentation of the preforms.

Figure 2:
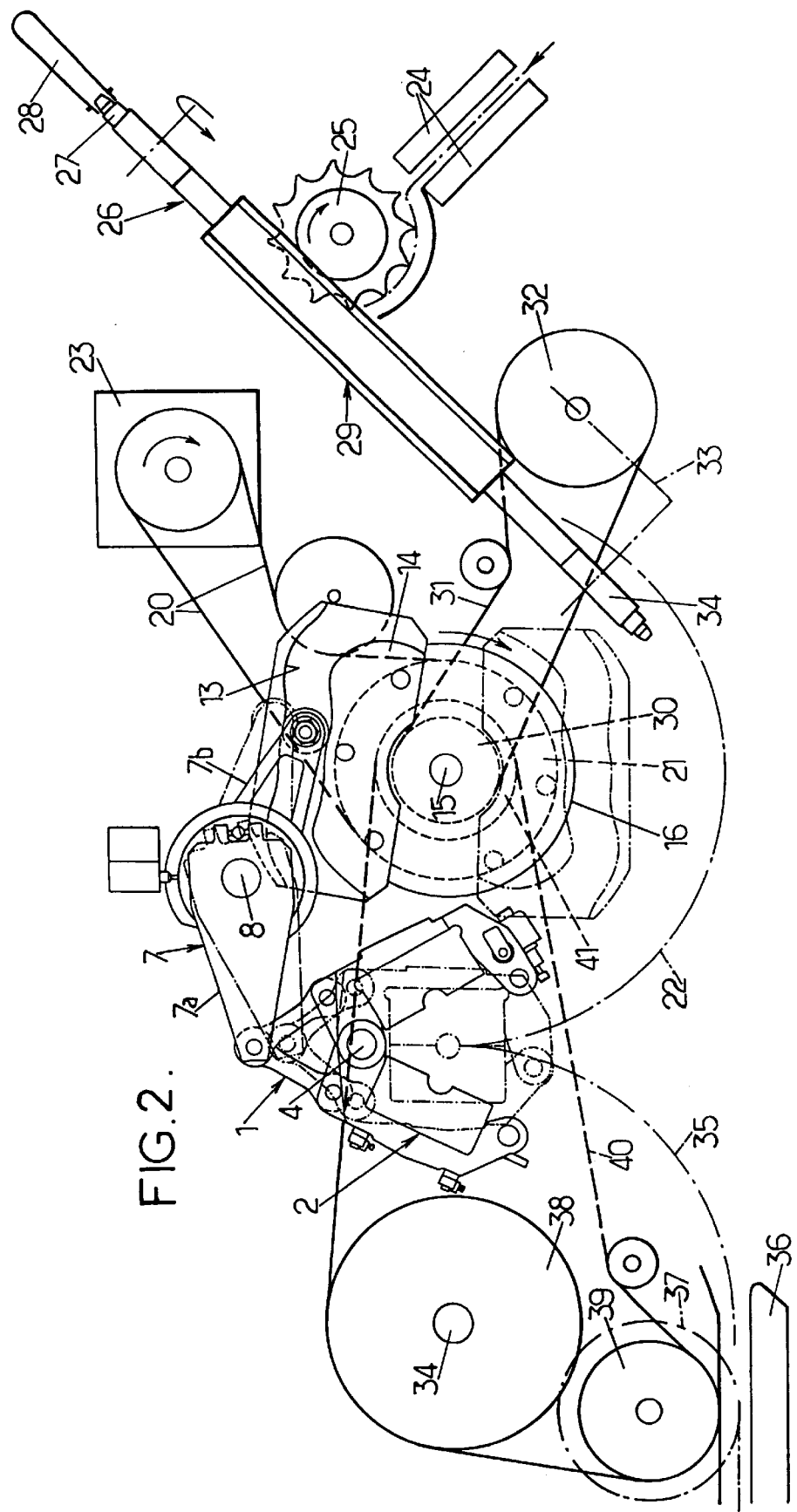
FIG. 2 is a highly diagrammatic view, from above, of a container manufacturing plant designed around a single-mold molding device according to FIG. 1.

The molding device which has just been described lends itself particularly to the production of a complete container manufacturing plant constructed around said molding device. FIG. 2 shows very diagrammatically, in a top view, such a plant. In FIG. 2, the same numerical references have been maintained for the same components as in FIG. 1.

In this plant, the belt 20 driving the pin 15 via the pulley 21 is driven by the output wheel of an electric motor 23.

The preforms are fed in the vertical position, neck up, via a slideway 24 as far as an individual loading and stepping wheel 25 which conveys the preforms under transfer means 26. The transfer means 26 are made in the form of an elongate endless chain which rotates about two extreme wheels and is equipped with a succession of gripping members 27 which grip the preforms 28, placed neck up on the wheel 25, and then, after turning them upsidedown, move them, neck down, through an oven 29 in which they are heated. On leaving the oven, the hot preforms are gripped by the aforementioned rotating clamp, which rotates about the pin 15, in order to be inserted into the open mold 2.

The above means are driven in the following manner. Fastened to the pin 15 is a pulley 30 which, via an endless link 31 such as a cogged belt, drives a pulley 32 associated with an angle transmission device 33 in order to drive one of the end regions 34 of the transfer means 26. As regards the loading wheel 25, this is integral with a coaxial toothed wheel (not visible in the drawing), which meshes with the endless chain forming the transfer means 26, and is driven by said chain.

Provided on the other side of the mold 2 is a rotating extraction clamp (not shown) which is mounted on a pin 34 and designed to grip the containers in the open mold and then to extract them therefrom in a path represented diagrammatically in the form of a circularly arcuate path 35 which conveys them to the entrance of an output slideway 36. In one variant, they are propelled along the output slideway 36 by a rotary mechanism 37. In this case, associated with the rotating clamp and with the mechanism 37 are coaxial rotational driving pulleys, respectively 38 and 39, over which passes an endless link such as a cogged belt 40 driven by a pulley 41 which is integral with the abovementioned pin 15.

By virtue of the arrangement which has just been described, the plant is entirely driven by a single motor, without any possibility of slippage of one mechanism with respect to another, and all the movements are perfectly synchronized. Of course, auxiliary drives may be provided for moving certain movable components, not mentioned above, for example movement of the mold bottom, movement of the elongation rod, control of the blowing, venting of the molding cavity at the end of the operation, etc.

These auxiliary components may also be set into motion by individual motors by providing synchronization taken from one of the rotating members driven positively by the motor, for example the drive region of the extraction clamp.

Furthermore, safety devices such as torque limiters may be associated with each rotating member in order to detect any accidental overload and to stop the plant immediately.

As goes without saying, and as moreover already results from the foregoing, the invention is in no way limited to those of its applications and its embodiments which have more especially been envisaged; on the contrary, it embraces all variants thereof.

What is claimed is:

1. Device for blow molding or stretch-blow molding bottles from thermoplastic preforms, the device including a single bill-fold type mold (2) having two half-shells joined to each other by a fixed mutual pivoting pin coinciding with respective edges of the two half-shells, and actuation means associated with the two half-shells in order to pivot the latter with respect to each other in the mold-closing direction or in the mold-opening direction, wherein the actuation means comprise a movable arm mounted so as to rotate freely about a fixed support pin and fastened to said half-shells, said arm furthermore supporting a cam follower, or a guide cam, capable of engaging with a rotating guide cam, or alternatively with a cam follower driven over a circular path, said cam being profiled in such a manner as to cause the arm to move so as to open and close the mold, and drive means for driving the rotating cam, or alternatively the cam follower, said drive means being synchronized with the feeding of the mold with preforms.

2. Device according to claim 1, wherein the pin for supporting the arm is located in a region of the arm lying between its two ends, a first end of the arm is fastened to the two half-shells, and a second end of the arm supports the cam follower, or alternatively the cam.

3. Device according to claim 2, wherein the actuation means comprise two swing links which are articulated, so as to rotate freely by one of their ends, to the first end of the arm, and are articulated, so as to rotate freely by their other ends, respectively to the two half-shells on each side of the mutual pivoting pin.

4. Device according to claim 1, wherein the cam follower is borne by the arm, and the rotating cam is supported by a rotating plate.

5. Device according to claim 1, wherein the cam is configured to engage with the cam follower from at least the start of mold opening until at least the end of mold closing, and auxiliary locking means, which are independent of the actuation means, are provided in order to keep the mold locked during molding from the end of mold closing until the start of mold opening.

6. Device according to claim 5, wherein the cam extends along an open section, and no longer engages with the cam follower between at least the end of mold locking and at least the start of mold unlocking.

7. Device according to claim 1, wherein the cam is configured in the form of a groove having two approximately parallel side faces capable of guiding the cam follower in radially opposed directions of movement.

8. Device according to claim 1, with which a rotating-clamp mechanism for feeding the hot preforms is associated, wherein the rotating clamp is coaxial with the rotating cam, or alternatively with the rotating roller, and fastened to the rotating cam, or alternatively to the rotating roller.

9. Plant for manufacturing containers, by blow molding or stretch-blow molding hot preforms, said plant comprising:

means for feeding preforms presented side by side one after the other in a vertical position, a wheel for loading and for stepping by a predetermined spacing the preforms delivered by the feed means, an endless chain of preform-transfer means which is driven by a drive wheel and designed to grip the preforms one by one on the loading wheel and to make them pass through a heating oven at a predetermined temperature in the neck-down position, a rotating insertion clamp for gripping the preforms one by one on the transfer chain and feeding them into a molding device, a single-mold molding device according to claim 1, and a rotating extraction clamp for gripping the molded containers in the molding device and taking them away to removal means, further comprising a single rotating driving member, and rotating endless link driving means for driving, without slippage, the abovementioned elements of the plant by means of the single driving member.

10. Plant according to claim 9, in which the single-mold molding device is arranged according to claim 4, wherein the rotating insertion clamp is coaxial with a rotation pin of the rotating cam and rotationally integral therewith.

11. Plant according to claim 10, wherein the rotating cam and the insertion clamp, the extraction clamp, and the wheel for driving the transfer chain are driven by respective belts.

12. Plant according to claim 11, wherein the loading wheel is driven by the transfer chain.

13. Plant according to claim 9, wherein the containers are bottles.

* * * * *